United States Patent
Boroczky et al.

(10) Patent No.: US 7,840,062 B2
(45) Date of Patent: Nov. 23, 2010

(54) FALSE POSITIVE REDUCTION IN COMPUTER-ASSISTED DETECTION (CAD) WITH NEW 3D FEATURES

(75) Inventors: Lilla Boroczky, Mount Kisco, NY (US); Kwok Pun Lee, Flushing, NY (US); Luyin Zhao, White Plains, NY (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 857 days.

(21) Appl. No.: 11/719,634

(22) PCT Filed: Nov. 21, 2005

(86) PCT No.: PCT/IB2005/053835
§ 371 (c)(1),
(2), (4) Date: May 17, 2007

(87) PCT Pub. No.: WO2006/054271
PCT Pub. Date: May 26, 2006

(65) Prior Publication Data
US 2009/0148010 A1    Jun. 11, 2009

Related U.S. Application Data

(60) Provisional application No. 60/629,750, filed on Nov. 19, 2004.

(51) Int. Cl.
*G06K 9/00* (2006.01)
*G01N 23/04* (2006.01)

(52) U.S. Cl. ............... 382/159; 382/224; 378/62

(58) Field of Classification Search ............ 382/100, 382/128, 129, 130, 131, 132, 133, 134, 154, 382/155, 168, 181, 189–203, 224, 232, 254, 382/274, 276, 305, 312, 159; 378/4, 24, 378/25, 62, 22; 706/16, 20
See application file for complete search history.

(56) References Cited

U.S. PATENT DOCUMENTS 6,707,878 B2 *   3/2004   Claus et al. ............... 378/22

(Continued)

FOREIGN PATENT DOCUMENTS

WO         0178005 A2     10/2001

(Continued)

OTHER PUBLICATIONS

Surface Normal Overlap: A Computer-Aided Detection Algorithm with Application to Colonic Polyps and Lung Nodules in Helical CT, by D. S. Paik et al., IEEE Trans. on Med. Imaging 2004.

(Continued)

*Primary Examiner*—Seyed Azarian (57) ABSTRACT

A method for computer aided detection (CAD) and classification of regions of interest detected within HRCT medical image data includes post-CAD machine learning techniques applied to maximize specificity and sensitivity of identification of a region/volume as being a nodule or non-nodule. The regions are identified by a CAD process, and automatically segmented. A feature pool is identified and extracted from each segmented region, and processed by genetic algorithm to identify an optimal feature subset, which subset is used to train the support vector machine to classify candidate region/volumes found within non-training data.

17 Claims, 5 Drawing Sheets

U.S. PATENT DOCUMENTS

| | | | |
|---|---|---|---|
| 6,724,856 B2 * | 4/2004 | De Man et al. | 378/62 |
| 6,996,549 B2 * | 2/2006 | Zhang et al. | 706/16 |
| 7,218,766 B2 * | 5/2007 | Eberhard et al. | 382/132 |
| 7,383,237 B2 * | 6/2008 | Zhang et al. | 706/20 |
| 7,756,313 B2 * | 7/2010 | Bi et al. | 382/128 |
| 2004/0252870 A1 * | 12/2004 | Reeves et al. | 382/128 |

FOREIGN PATENT DOCUMENTS

| | | | |
|---|---|---|---|
| WO | 2005078629 A2 | 8/2005 | |

OTHER PUBLICATIONS

Learning Based Pulmonary Nodule Detection from Multislice CT Data, by Xiaoguang Lu et al.

Computer-Aided Detection of Lung Nodules: False Positive Reduction under a 3D Gradient Field Method, by Zhanyu GE et al., Medical Imaging 2004.

Feature Selection for Computer-Aided Polyp Detection using Genetic Algorithms, by M.T. Miller et al., Proc. of the SPIE, vol. 5031, 2003.

Feature Subset Selection for Improving the Performance of False Positive Reduction in Lung Nodule CAD, by L. Boroczky et al., 2005.

* cited by examiner

Fig. 1

Figure 2. GA-based feature subset selection process

Fig. 3 training a classifier using
training data with regions/volumes
having a known ground truth

500 detecting candidate regions within
new non-training medical image data

520 segmenting the candidate regions

530 extracting a pool of features from
segmented candidate regions

540 processing the pool of features by
the trained classifier to map the candidate
region into a true or false identification.

FALSE POSITIVE REDUCTION IN COMPUTER-ASSISTED DETECTION (CAD) WITH NEW 3D FEATURES

RELATED APPLICATIONS

This application/patent derives from U.S. Provisional Patent Application No. 60/629,750, filed Nov. 19, 2004, by the named applicants. The application is related to commonly-owned, co-pending Philips applications PHUS040505 (779361), PHUS040500 (778964) and PHUS040501 (778962).

The present inventions relate to computer-aided detection systems and methods. The inventions relate more closely to systems and methods for false positive reduction in computer-aided detection (CAD) of clinically or morphologically interesting regions and/or volumes of interest, e.g., lung nodules, particularly within high-resolution, thin-slice computed tomographic (HRCT) images, and a support vector machine (SVM) implements post-CAD classification utilizing new 3D features, resulting in very high specificity while maintaining appropriate sensitivity.

The speed and sophistication of current computer-related systems support development of faster, and more sophisticated medical imaging systems. The consequential increase in amounts of data generated for processing, and post-processing, has led to the creation of numerous application programs to automatically analyze the medical image data. That is, various data processing software and systems have been developed in order to assist physicians, clinicians, radiologists, etc., in evaluating medical images to identify and/or diagnose and evaluate medical images. For example, computer-aided detection (CAD) algorithms and systems have developed to automatically identify "suspicious" regions (e.g., lesions) from multi-slice CT (MSCT) scans. CT, or computed tomographic systems, is an imaging modality that is commonly used to diagnose disease through imaging, in view of its inherent ability to precisely illustrate size, shape and location of anatomical structures, as well as abnormalities or lesions.

CAD systems can automatically detect (identify) morphologically interesting regions (e.g., lesions, nodules, microcalcifications), and other structurally detectable conditions/regions, which might be of clinical relevance. When the medical image is rendered and displayed, the CAD system marks or identifies the investigated region. The marks are to draw the attention of the radiologist to the suspected region. For example, in the analysis of a lung image seeking possibly cancerous nodules, the CAD system will mark the nodules detected. As such, CAD systems incorporate the expert knowledge of radiologists to automatically provide a second opinion regarding detection of abnormalities in medical image data. By supporting the early detection of lesions or nodules suspicious for cancer, CAD systems allow for earlier interventions, theoretically leading to better prognosis for patients.

Most existing work for CAD and other machine learning systems follow the same methodology for supervised learning. The CAD system starts with a collection of data with known ground truth. The CAD system is "trained" on the training data to identify a set of features believed to have enough discriminant power to distinguish the ground truth, i.e., nodule or non-nodule in non-training data. Challenges for those skilled in the art include extracting the features that facilitate discrimination between categories, ideally finding the most relevant sub-set of features within a feature pool. Once trained, the CAD system may then operate on non-training data, where features are extracted from CAD-delineated candidate regions and classified.

CAD systems may combine heterogeneous information (e.g. image-based features with patient data), or they may find similarity metrics for example-based approaches. The skilled artisan understands that the accuracy of any computer-driven decision-support system is limited by the availability of the set of patterns already classified by the learning process (i.e., by the training set). The output of any computer-learning system used in diagnostic scanning processes is an advice. So with each advice presented to the clinician as a possible candidate nodule, the clinician is compelled to investigate. That is, where a CAD assisted outcome represents a bottom line truth (e.g., nodule) of an investigated region, the clinician would be negligent were, he/she to NOT investigate the region more particularly. Those skilled in the art should understand that in a diagnostic context, "true positive" often refers to a detected nodule that is truly malignant. However, in a CAD context, a marker is considered to be a true positive marker even it points at a benign or calcified nodule. It follows that "true negative" is not defined and a normalized specificity cannot be given in CAD.

False positive markings (output from a CAD system) are those markings which do not point at nodules at all, but at scars, bronchial wall thickenings, motion artifacts, vessel bifurcations, etc. Accordingly, CAD performance is typically qualified by sensitivity (detection rate) and false positive rate or false positive markings per CT study, which is often referred as specificity in the context of CAD, and as such, it is quite desirable for a CAD system to output minimal false positives.

After completion of the automated detection processes (with or without marking), most CAD systems automatically invoke one or more tools for application of user- and CAD-detected lesions (regions) to, for example, eliminate redundancies, implemented interpretive tools, etc. To that end, various techniques are known for reducing false positives in CAD. For example, W. A. H. Mousa and M. A. U. Khan, disclose their false positive reduction technique entitled: "Lung Nodule Classification Utilizing Support Vector Machines," Proc. of IEEE ICIP'2002. K. Suzuki, S. G. Armato III, F. Li, S. Sone, K. Doi, describe an attempt to minimize false positives in: "Massive training artificial neural network (MTANN) for reduction of false positives in computerized detection of lung nodules in low-dose computed tomography", Med. Physics 30(7), July 2003, pp. 1602-1617, as well as Z. Ge, B. Sahiner, H.-P. Chan, L. M. Hadjiski, J. Wei, N. Bogot, P. N. Cascade, E. A. Kazerooni, C. Zhou, "Computer aided detection of lung nodules: false positive reduction using a 3D gradient field method", Medical Imaging 2004: Image Processing, pp. 1076-1082.

Conventional False Positive Reduction (FPR) systems are often embedded in CAD algorithms to improve specificity, as well as for use in post-CAD processing to improve specificity. For example, R Wiemker, et al., in their COMPUTER-AIDED SEGMENTATION OF PULMONARY NODULES: AUTOMATED VASCULATURE CUTOFF IN THIN-AND THICK-SLICE CT, 2003 Elsevier Science BV, discuss maximizing sensitivity of a CAD algorithm to effectively separate lung nodules from the nodule's surrounding vasculature in thin-slice CT (to remedy the partial volume effect). The intended end is to reduce classification errors. However, the Wiemker. CAD systems and methods do not use sophisticated machine learning techniques, nor do they optimize feature extraction and selection methods for FPR. For example, while Mousa, et al., utilize support vector machines to distinguish true lung nodules from non-nodules (FPs), their system is based on a very simplistic feature extraction unit, which may limit rather than improve specificity.

It is the features identified and extracted from candidate regions under study, and the use of the features in a CAD or FPR system (trained using same features), that provides for the systems' discriminatory power to distinguish "True" findings, e.g., nodules, from non-nodules (False positives).

It is therefore the object of this invention to provide CAD-related systems and methods that show a decided improvement in specificity, i.e., false positive reduction, through implementation of one or more novel 3-dimensional (3D) features supporting post-CAD machine learning during the system training phase, and post-CAD processing of non-training data, resulting in improved specificity.

Two sets of new 3D features are used in the invention. When the two new sets of 3D features, or some sub-set thereof, are combined with other well-known features, a CAD or FPR system implementing same inventive 3D features, provides for an ability to better distinguish true positive identifications from false positives, e.g., lung nodules from non-modules.

A first group of these new 3D features is based upon histogram measures of the gray-level distribution, excluding lung walls attached to the structures. The other 3D feature group is based on gradient distribution, and the changes of the gradient field in specific directions. For example, the extracted 3D features support training, and post-training processing by a support vector machine to realize a false positive reduction system for thin-slice thoracic CT scans in a CAD process, resulting in high specificity. The proposed 3D-based features in this invention solve this problem by providing 3D characterization of the lung nodules, and structures misinterpreted as nodules. Therefore, the classifier trained using these novel 3D features may better distinguish nodules from non-nodules to achieve higher specificity than CAD or FPR systems that do not use same features for training and subsequent non-training operation, resulting in an improvement in the discriminatory powers of the trained system while maintaining sensitivity. Those skilled in the art should understand that other classifiers than SVM can be used in relation with the new 3D features.

While the inventive systems and methods are described herein as operating on CT data, or high-resolution CT scan data (HRCT), those skilled in the art understand that the descriptions are not meant to limit the scope of the inventions to operation on CT or HRCT data, but may operate on any acquired imaging data, limited only by the scope of the claims attached hereto.

The inventive CAD or FPR systems include a machine-learning sub-system, the sub-system comprising a feature extractor, genetic algorithm (GA) (for selecting the most relevant features for supervised system training, including the inventive 3D-based features disclosed herein), and a support vector machine (SVM). Those skilled in the art should understand, that once the most relevant features are selected by the GA, the GA-based feature selection will not be part of the final FPR sub-system. The SVM qualifies candidate regions detected by CAD as to some ground truth fact, e.g., whether a region/volume is indeed a nodule or non-nodule, under the constraint that all true positive identifications are retained.

Post-CAD machine learning includes use of a genetic algorithm (GA) to select a subset of features from a feature pool (including the novel 3D features) to best classify candidate regions within non-training data using a SVM trained on what the GA has determined to be the "best" sub-set of features with sufficient specificity to virtually eliminate false positives, and maintaining sensitivity.

The new features can be extracted from thin slice CT scans, and they describe 3D characteristics of the structures detected by a CAD algorithm. One group of these features is based on some histogram measures of the gray-level distribution excluding lung walls attached to the structures. The other group of the features is based on gradient distribution and the changes of the gradient field in specific directions. A post-processing step based on machine learning, including the new 3D features, eliminates as many false positives as possible (high specificity), while maintaining CAD sensitivity. More particularly, feature extraction is one of the most important elements of CAD processes, as features must have sufficient discriminatory power to distinguish true from false identifications, e.g., nodules from non-nodules.

The underlying goal of computer assistance in detecting lung nodules in image data sets (e.g., CT) is not to designate the diagnosis by a machine, but rather to realize a machine-based algorithm or method to support the radiologist in rendering his/her decision, i.e., pointing to locations of suspicious objects so that the overall sensitivity (detection rate) is raised. The principal problem with CAD or other clinical decision support systems is that inevitably false markers (so called false positives) come with the true positive marks.

Clinical studies support that measured CAD detection rates, as distinguished from measured rates of detection by trained radiologists depend on the number of reading radiologists, verifying CAD accuracy. The more trained readers that participate in reading of suspicious lesions, microcalcifications, etc., the larger the number of lesions (within an image), which will be found. Those skilled in the art should note that any figures depicting absolute sensitivity, whether reading by CAD or skilled practitioner, may be readily misinterpreted. That is, data from clinical studies tend to support that a significant number of nodules are more readily detectable by additional CAD software, that were overlooked by reading radiologists without a CAD system. The present inventions provide for increased specificity (better FPR), while maintaining sensitivity (true nodule findings).

CAD-based systems that include false positive reduction processes, such as those described by Wiemker, Mousa, et al., etc., have one big job and that is to identify "actionable" structures detected in medical image data. Once identified and segmented, a comprehensive set of significant features is obtained by the CAD system or the following FPR subsystem in the case of this invention in order to classify the segmented region as to some ground truth, e.g., nodule or non-nodule. Those skilled in the art will recognize that the accuracy of computer driven decision support, or CAD systems, is limited by the availability of a set of patterns or regions of known pathology used as the training set. Even state-of-the-art CAD algorithms, such as described by Wiemker, R., T. Blaffert, in their: *Options to improve the performance of the computer aided detection of lung nodules in thin-slice CT.* 2003, Philips Research Laboratories: Hamburg, and by Wiemker, R., T. Blaffert, in their: *Computer Aided Tumor Volumetry in CT*

*Data, Invention disclosure*. 2002, Philips Research, Hamburg, can result in high numbers of false positives, leading to unnecessary interventions with associated risks and low user acceptance.

Moreover, current false positive reduction algorithms often were developed for chest radiograph images or thick slice CT scans, and do not necessarily perform well on data originated from HRCT.

To that end, the inventive FPR systems and methods described herein, includes a CAD sub-system or process to identify candidate regions, and segment the region. During training, the segmented regions within the set of training data are passed to a feature extractor, or a processor implementing a feature extraction process. Feature extraction obtains a feature pool consisting of 3D and 2D features from the detected structures, including the new 3D features disclosed and claimed hereby. The feature pool is passed to a genetic algorithm (GA) sub-system, or GA processor (post CAD), which processes the feature pool to realize an optimal feature subset. An optimal feature subset includes those features that provide sufficient discriminatory power for the SVM, within the inventive CAD or FPR system, to identify the candidate regions/volumes.

During training, post-CAD processing by the GA determines optimal sub-sets of features for use by the SVM to positively identify the nodules. This process determines an optimal sub-set of features for post-CAD use. Thereafter, the CAD processes "new" image data, segmenting candidate regions found in non-training data. The sub-set of features (as determined during training) is extracted from the candidate regions, and used by the "trained" classifier (SVM) to classify a candidate with proper classification with proper specificity. The inventive FPR or CAD systems are able to thereby accurately, and with sufficient specificity, detect small lung nodules in high resolution and thin slice CT (HRCT), similar in feature to those comprising the training set, and including the new and novel 3D features. For example, HRCT data with slice thickness<=1 mm provides data in sufficient detail that allows for detection of very small nodules. The ability to detect smaller nodules requires new approaches to reliably detect and discriminate candidate regions, as set forth in the claims hereinafter.

Figure 1:
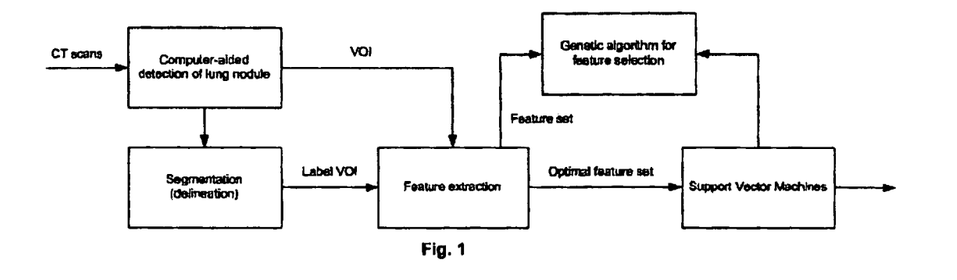
FIG. 1 is a diagram depicting a system for false positive reduction (FPR) in computer-aided detection (CAD) from Computed Tomography (CT) medical images using support vector machines (SVMs)

A preferred embodiment of an FPR system 400 of the invention will be described broadly with reference to FIG. 1. FPR system 400 includes a CAD sub-system 420, for identifying and segmenting regions or volumes of interest that meet particular criteria, and an FPR subsystem 430. Preferably, the CAD sub-system 420 includes a CAD processor 410, and may further include a segmenting unit 430, to perform low level processing on medical image data, and segmenting same. Those skilled in the art will understand that CAD systems must perform a segmenting function to delineate candidate regions for further analysis, whether the segmenting function is implemented as a CAD sub-system, or as a separate segmenting unit, to support the CAD process (such as segmenting unit 430). The CAD sub-system 420 provides for the segmenting of candidate regions or volumes of interest, e.g., nodules, whether operating on training data or investigating "new" candidate regions, and guides the parameter adjustment process to realize a stable segmentation.

The segmented data are provided to a feature extraction unit 440, comprising the FPR sub-system 430. A pool of features, including the two "new" sets of 3D-based features as taught hereby, is extracted or generated to qualify each segmented region/volume. The pool of features is then operated upon by a Genetic Algorithm processor 450, to identify a "best" sub-set of the pool of features. The intent behind the GA processing is to maximize the specificity to the ground truth by the trained CAD system, as predicted by an SVM 460. That is, GA processor 450 generates or identifies a sub-set of features which when operated upon by the SVM, increase specificity in non-training data. The GA-identified sub-set of features is determined with respect to both the choice of and number of features that should be utilized by the SVM with sufficient specificity to minimize false positive identifications. Once the optimal feature subset is determined by the GA using the training dataset, the GA processor is not needed when the trained CAD system operates on non-training data.

CAD sub-system 420 delineates the candidate nodules (including non-nodules) from the background by generating a binary or trinary image, where nodule-, background- and lung-wall (or "cut-out") regions are labeled. Upon receipt of the gray-level and labeled candidate region or volume, the feature extractor 440 calculates (extracts) any relevant features, such as 2D and 3D shape features, histogram-based features, gradient-based features, etc., as a pool of features. In training mode, feature extraction is crucial as it greatly influences the overall performance of the FPR system. Without proper extraction of the entire set or pool of features, the GA processor 450 may not accurately determine an optimal feature sub-set with the best discriminatory power and the smallest size (in order to avoid over-fitting and increase generalizability).

A GA-based feature selection process is taught by commonly owned, co-pending Philips application number US040120 (ID disclosure # 779446), the contents of which are incorporated by reference herein. The GA's feature subset selection is initiated by creating a number of "chromosomes" that consist of multiple "genes". Each gene represents a selected feature. The set of features represented by a chromosome is used to train an SVM on the training data. The fitness of the chromosome is evaluated by how well the resulting SVM performs. In this invention, there are three fitness functions used: sensitivity, specificity, and number of features included in a chromosome. The three fitness functions are ordered with different priorities, in other words, sensitivity has 1st priority, specificity 2nd, and number of features the 3rd. This is called a hierarchical fitness function. At the start of this process, a population of chromosomes is generated by randomly selecting features to form the chromosomes. The algorithm (i.e., the GA) then iteratively searches for those chromosomes that perform well (high fitness).

Figure 2:
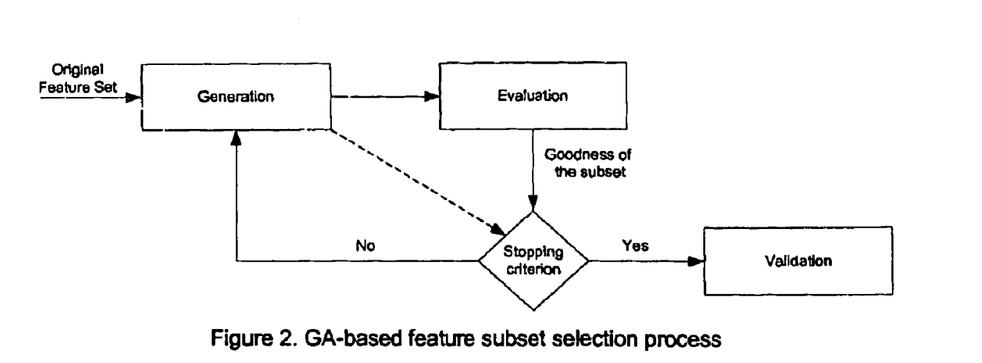
FIG. 2 is a system-level diagram depicting feature sub-set selection.

At each generation, the GA evaluates the fitness of each chromosome in the population and, through two main evolutionary operations, mutation and crossover, creates new chromosomes from the current ones. Genes that are in "good" chromosomes are more likely to be retained for the next generation and those with poor performance are more likely to be discarded. Eventually an optimal solution (i.e., a collection of features) is found through this process of survival of the fittest. After the feature subset including the new 3D features is determined, it is used to train a classifier, for example SVM. FIG. 2 represents the general workflow of the GA-based feature sub-set selection process.

Figure 3:
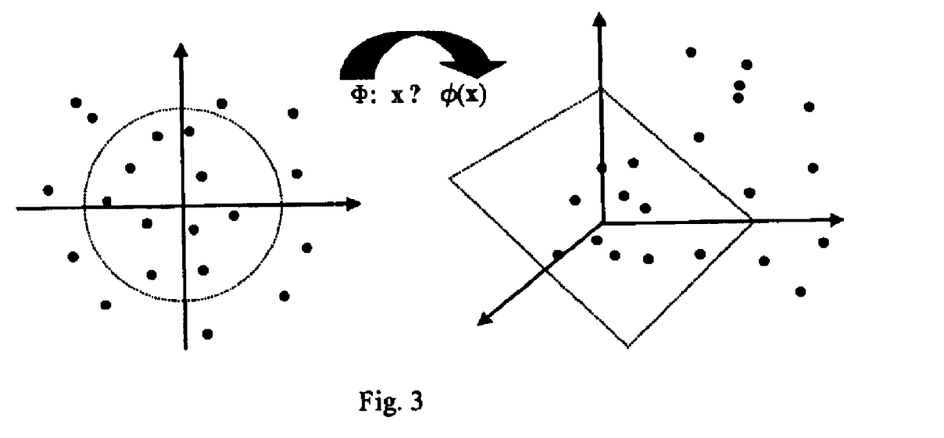
FIG. 3 is a diagram depicting the basic idea of a support vector machine.

Those skilled in the art should understand that SVMs map "original" feature space to some higher-dimensional feature space, where the training set is separable by a hyperplane, as shown in FIG. 3. The SVM-based classifier has several internal parameters, which may affect its performance. Such parameters are optimized empirically to achieve the best possible overall accuracy. Moreover, the feature values are normalized before being used by the SVM to avoid domination of features with large numeric ranges over those having smaller numeric ranges, which is the focus of the inventive system and processes taught by commonly-owned, co-pending Philips application No. US 040499 (ID disclosure no. 778965).

The inventive FPR system was validated using a lung nodule dataset that included training data or regions whose pathology is known. The validation was implemented and the inventive FPR system using the new 3D features was shown to reduce the majority of false nodules while virtually retaining all true nodules.

Figure 4:
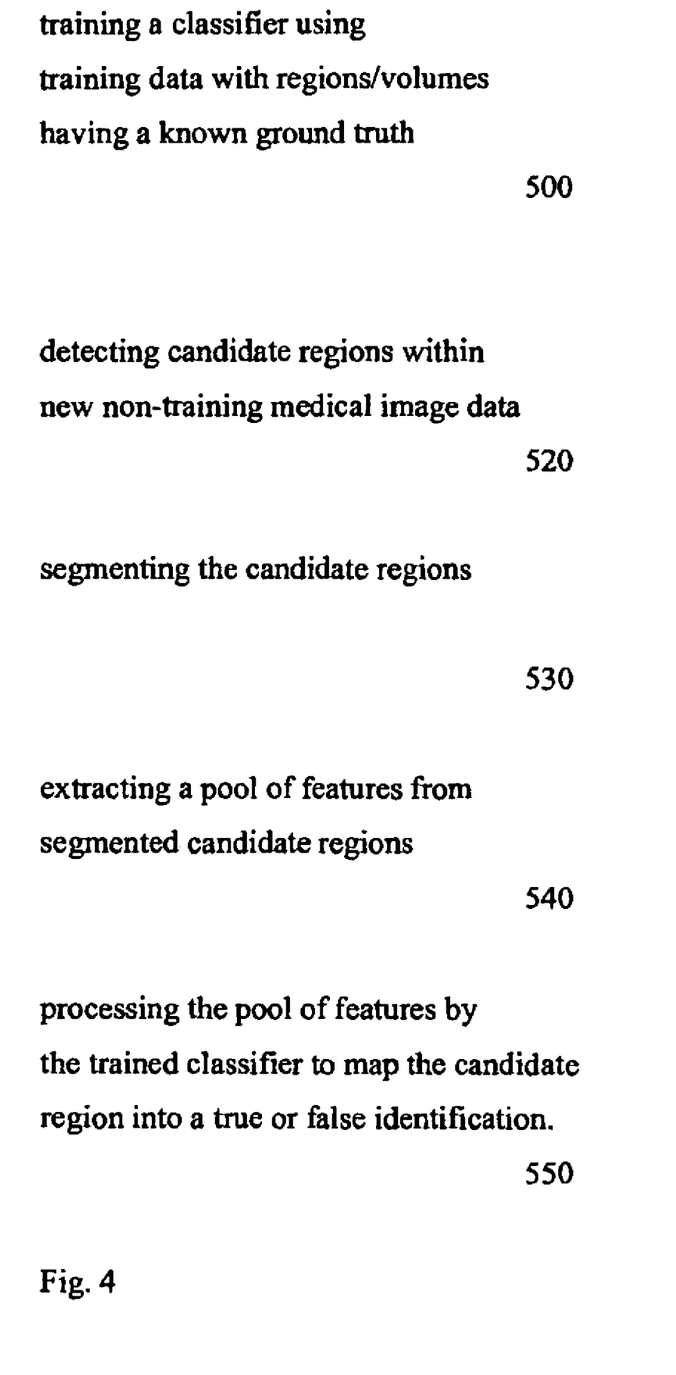
FIG. 4 is a process flow diagram identifying an exemplary process of the inventions.

FIG. 4 is a flow diagram depicting a process, which may be implemented in accordance with the present invention. In FIG. 4, box 500 represents training a classifier on a set of medical image training data for which a clinical ground truth about particular regions or volumes of interest is known. The step may include training a classifier on a set of medical image training data selected to include a number of true and false nodules, and automatically segmented. A feature pool is identified/extracted from each segmented region and volume within the training data, and preferably includes the new 3D features as taught hereby. The feature pool is processed by genetic algorithm processor to identify an optimal feature subset, upon which the support vector machine is trained.

Box 520 represents a post-training step of detecting, within new or non-training medical image data, the regions or volumes that are candidates for identification as to the ground truth, e.g., nodules or non-nodules. Box 530 represents the step of segmenting the candidate regions, and Box 540 represents the step of processing the segmented candidate regions to extract those features, i.e., the sub-set of features, determined by the GA to be the most relevant features for proper classification. Then, as shown in block 550, the support vector machine determines the false positive identifications of non-training candidate regions with improved specificity, and maintaining sensitivity.

The new 3D-based features proposed hereby include a set of 3D histogram-based features, and a set of 3D gradient-based features. Each of the two sets of the new features are calculated from a volume of interest (VOI) containing a structure that is detected by the CAD algorithm as a nodule. As lung nodules or the misinterpreted structures are often attached to the lung wall, the pixels identified to be lung walls are excluded from the histogram calculation. If this is not done, the features will not reliably characterize the candidates consisting of nodules and the non-nodules, which are necessary to distinguish from each other. The wall removal procedure is based on image processing. Then, certain statistics (e.g. $2^{nd}$ and higher-order) may be calculated from the histograms.

The 3D gradient based features are based on the 3D gradient field, which 3D gradient field is calculated on the surface of the nodules or structures. The gradient field is then analyzed in certain directions, such as the principal directions of the objects. The difference of the gradient field on the surface of a nodule and non-nodule along the principal direction is exploited in the proposed gradient-based features. When the new feature is implemented in an SVM-based false positive reduction system, it results in high reduction of false positives, while the sensitivity of the CAD algorithm was maintained.

Feature Extraction

At least twenty-three (23) features from the VOI images may be extracted from the region/volume to form the feature pool. These 2D and 3D features (Table 1) characterize the detected structures from different aspects (e.g. gray-level distribution, shape) exploiting the opportunities offered by thin slice CT scans.

TABLE 1

| # | Feature | Definition |
|---|---------|------------|
| 1-4 | gray_level_max, gray_level_min, gray_level_mean, gray_level_std | Maximum, minimum, mean, standard deviation of gray level inside the delineated structure |
| 5 | Compactness | Ratio of volume equivalent radius and spatial deviation equivalent radius |
| 6-8 | flat_shape, spheric_shape, elongated_shape | Ratio of eigenvectors of inertia matrix of the structure |
| 9 | Sphericity | Ratio of volume of the structure within a volume-equivalent sphere centered at the centroid of the structure and the whole volume. |
| 10 | Contrast | Difference between the mean gray values inside and in a shell surrounding the structure |
| 11 | histogram_mean, histogram_std, histogram_skewness, histogram_kurtosis | Mean, standard deviation, skewness, kurtosis of gray values in a cube centered in the VOI excluding lung-wall pixels |
| 15 | histogram_high_value_count | Ratio of number of pixels having high gray value in the cube centered in the VOI and the volume of the structure |
| 16-23 | grad_max, grad_min, grad_mean, grad_std, grad_skewness, grad_kurtosis, grad_small_value_ratio, grad_max_principal | Maximum, minimum, mean, standard deviation, skewness, kurtosis, small value ratio and maximum along the principal direction of the gradient calculated in the surface of the structure. |

The first four features in Table 1 describe the 3D gray level distribution inside the delineated objects as lung nodules often have higher gray values than parts of vessels misidentified as nodules. Features #5-9 attempt to distinguish true nodules from false ones by characterizing the 3D shape of the delineated objects, because misidentified structures, e.g. part of vessels, tend to have more elongated shape than true nodules. Features #6-8 are calculated as ratios between different eigenvalues of the inertia matrix computed from the delineated 3D objects. Feature #10 is based on the observation that true nodules and false ones tend to have different 3D contrast between the interior and surroundings of the delineated objects.

As shape-based features are often difficult to calculate for small nodules, we have developed certain histogram-based features (#11-15) that do not require a priori segmentation of the objects. They are calculated as central moments of a cube centered in the volume of interest but excluding the wall pixels attached to the structures. Features #15-23 are based on gradient distribution and the changes of the gradient field in specific directions. By analyzing the gradient field on the surface of the detected structures we can distinguish nodules from non-nodules. Especially the gradient along the principal direction of a nodule and a non-nodule is different as in a non-nodule the gradient does not change dramatically, as the vessel continues.

To prevent unnecessary computations and overfitting and to ensure a reliable classifier, the inventions disclosed herein include a feature subset selection process, based on the use of GAs. In particular, a GA called CHC was used because of its robustness. The CHC automatically determines the optimal size and the set of such features.

Figure 5:
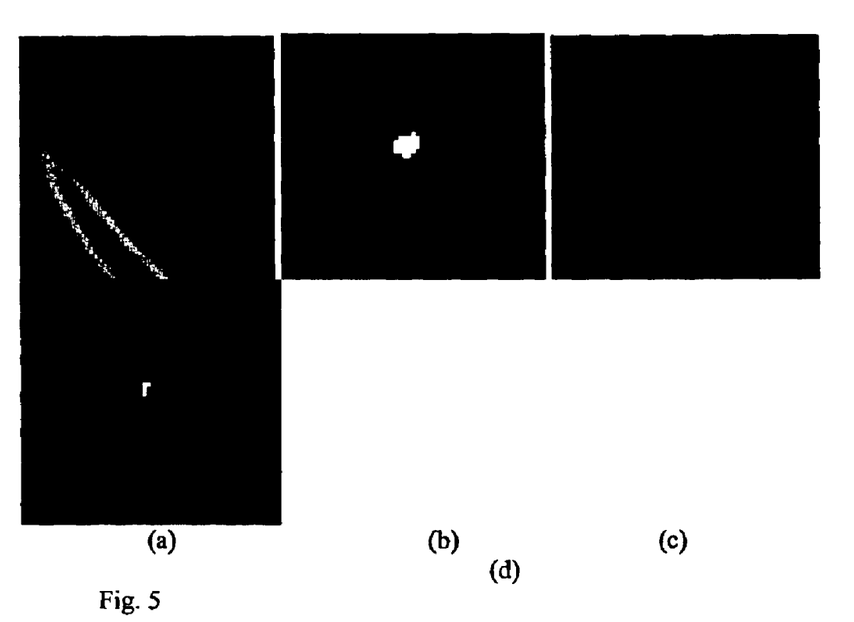
FIGS. 5a, 5b, 5c and 5d show (a) a true nodule, (c) a false nodule, (b) and (d) are segmentation masks.

FIG. 5a-d show a true nodule (5a) and a falsely detected one (5c), which is actually part of a vessel. FIGS. 5b and 5d show the corresponding segmentation masks. As often nodules or structures are attached to the lung walls, it is essential to exclude these pixels from further calculations. The wall and other pixels, which were cut-out during the delineation of the structures, can be identified by a segmentation algorithm. These algorithms can provide a trinary segmentation mask, where one of the levels (e.g. the middle level) indicates which are the wall and "cut-out" pixels. In the proposed invention we use image processing techniques to identify the wall pixels. Note, we do not want to exclude "cut-out" pixels e.g. vessels from our calculations, as they could be important to distinguish nodules from non-nodules. We have identified a pixel to be a wall pixel if all of its 8 nearest neighbors have also middle level labels. To prevent "holes" in relatively thin structure, like a vessel, we apply a post-processing step to fill-in these holes after scanning the entire volume of interest for wall pixels. In particular a pixel declared as a wall pixel will be changed back to a non-wall pixel if its neighbors have labels as shown in FIG. 6. Table 2 shows the filter masks we have used for this operation: This figure should put in the end.

TABLE 2

Filter masks used for filling in possible holes originated from the wall removal procedure:

| XXX | XYX | XXY | YXX |
| YOY | XOX | XOX | XOX |
| XXX | XYX | YXX | XXY |

O: current pixel;,
X: label with middle-level;,
Y: arbitrary label

As the false positive nodules are often too small for calculating certain shape- and texture-related features we calculate instead quantities which are based on the gray-level distribution of the volume of interest (VOI) and do not require segmentation. In particular, we calculate histogram-based features such as moments and central moments in a cube centered in the center of the VOI, but excluding all of the wall pixels, which were described above. Table 3 shows the definitions of these features.

TABLE 3

Histogram-based features

| Feature | Definition |
| --- | --- |
| Histogram mean ($m_1$) | $m_1 = \sum_x x \cdot p(x)$ |
| Histogram standard deviation ($\sigma$) | $\sigma = \left[\sum_x (x - m_1)^2 p(x)\right]^{1/2}$ |
| Histogram skewness | $\sum_x (x - m_1)^3 p(x)$ |
| Histogram kurtosis | $\sum_x (x - m_1)^4 p(x)$ |
| Histogram high value count | $\dfrac{\text{Number of pixels with gray level} \geq \text{Threshold}}{\text{volume of the nodule}}$ |

In Table 3, $$p(x) = \frac{\text{number of pixels with gray level } x}{\text{total number of pixels in the cube}}.$$

In our experiments we use 20 histogram bins and the size of the cube is 13×13×13 pixels. The Threshold in the definition of the Histogram_high_value_count feature definition was approximately 900 in our experimental results.

In thin slice CT scans the CAD algorithm often detect part of vessels as nodules. By analyzing the gradient field on the surface of the detected and delineated structures we can distinguish nodules from non-nodules. Especially the gradients along the principal direction of a nodule and non-nodule are different as in non-nodule the gradient does not change dramatically, as the vessel continues. In the case of real nodules the changes are more significant as the nodules are more compact.

Initially, the gradient field on the 3D surface of the delineated object is calculated using a 3D gradient kernel. Then the magnitude of the gradient at each point of the surface is calculated. And the principal direction of the objects based on 3D moments is calculated, along with the inertia matrix of the nodules based on the second-order central moments:

$$I = \begin{bmatrix} M_{200} & M_{110} & M_{101} \\ M_{110} & M_{020} & M_{011} \\ M_{101} & M_{011} & M_{002} \end{bmatrix} \quad (1)$$

where $M_{ijk}$ is the (i, j, k) central moment and calculated from the "label" data, L as:

$$M_{ijk} = \Sigma (sl - c_{sl})^i (\text{row} - c_r)^j (\text{col} - c_c)^k L(sl, \text{row}, \text{col}) \quad (2)$$

where $c=(c_{sl}, c_r, c_c)$ denotes the centroid of the nodule. The coordinates of the centroid are defined as:

$$c_{sl} = \frac{1}{size} \sum_{sl,row,col} slL(sl, row, col) \quad (3)$$

$$c_r = \frac{1}{size} \sum_{sl,row,col} rowL(sl, row, col)$$

$$c_c = \frac{1}{size} \sum_{sl,row,col} colL(sl, row, col)$$

The eigenvectors of the inertia matrix determine the principal axes of an object. Particularly we use the eigenvector, which corresponds to the largest eigenvalue. Along this direction we use the distribution of the gradient magnitude as the feature, which can distinguish between nodules and non-nodules, like part of vessels.

It is significant to note that software required to perform the inventive methods, or which drives the inventive FPR classifier, may comprise an ordered listing of executable instructions for implementing logical functions. As such, the software can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present invention, particularly, any "preferred" embodiment(s), are merely possible examples of implementations that are merely set forth for a clear understanding of the principles of the invention. Furthermore, many variations and modifications may be made to the above-described embodiments of the invention without departing substantially from the spirit and principles of the invention. All such modifications and variations are intended to be taught by the present disclosure, included within the scope of the present invention, and protected by the following claims.

The invention claimed is:

1. A method for computer-assisted detection (CAD) of regions or volumes of interest ("regions") within medical image data that includes CAD processing to detect and delineate candidate regions, and post-CAD machine learning in a training phase to maximize specificity and reduce the number of false positives reported after processing non-training data, which method includes the steps of:
    training a classifier on a set of medical image training data selected to include a number of regions known to be true and false for a ground truth, identifying and segmenting the regions using said CAD processing, extracting features to create a pool of features to qualify the regions, including at least one of a 3D histogram-based feature, and a 3D gradient-based feature, applying a genetic algorithmic processor to the pool of features to determine a minimal sub-set of features for use by a support vector machine (SVM) to identify candidate regions within non-training data with improved specificity;
    detecting, within non-training data, candidate regions
    segmenting the candidate regions within the non-training data;
    extracting a set of features relating to each segmented candidate region; and
    mapping candidate regions by the SVM using the sets of features.

2. The method as set forth in claim 1, further comprising the step of training further includes determining both the size of the sub-set of features optimized by the genetic algorithm (GA) during training, for each candidate region in the training data, and the actual features comprising the sub-sets in order to optimize SVM mapping to a "best" fit.

3. The method as set forth in claim 1, wherein the step of training further includes defining a pool of features identified within each region within the training data as a chromosome, where each gene represents a feature, and where the genetic algorithm initially populates the chromosomes by random selection of features, and iteratively searches for those chromosomes that have higher fitness, wherein the evaluation is repeated for each generation, and using mutation and crossover, generates new and more fit chromosomes during the training phase.

4. The method as set forth in claim 3, wherein the determining includes applying the genetic algorithm (GA) in two phases, including:
    a.) identifying each chromosome as to both its set of features, and the number of features; and
    b.) analyzing, for each chromosome, the identified set of features, and the identified number of features, to determine the optimal size of the feature based on the number of occurrences of different chromosomes and the number of average errors.

5. The method as set forth in claim 1, wherein the step of training includes identifying wall pixels utilizing filter masks.

6. The method as set forth in claim 1, wherein the 3D-based histogram set includes at least one of: Histogram mean ($m_1$), Histogram standard deviation ($\sigma$), Histogram skewness, Histogram kurtosis and Histogram high value count.

7. The method as set forth in claim 1, wherein the 3D-based gradient set is generated by first calculating the gradient field on the 3D surface of the delineated object using a 3D gradient kernel, calculating a magnitude of the gradient in each point of the surface, and calculating the principal direction of the objects based on 3D moments, and the inertia matrix of the nodules based on the second-order central moments.

8. A computer readable medium comprising a set of computer readable instructions, which upon downloading to a general purpose computer, implements a method as set forth in claim 1.

9. A method for generating from medical imaging data, a histogram-based 3D feature set, based on grey-level distribution of a volume of interest within the medical imaging data, comprising a step of:

calculating at least one of the following histogram-derived features: Histogram mean ($m_1$), Histogram standard deviation ($\sigma$), Histogram skewness, Histogram kurtosis and Histogram high value count, wherein the step of calculating includes a step of excluding all wall pixels within said region of interest.

10. The method as set forth in claim 9, wherein the step of calculating includes utilizing a function, p(x), defined as the number of pixels with a gray level x, divided by the total number of pixels in a histogram bin.

11. A method for generating from medical imaging data, a gradient-based 3D feature set to support classification of an object under investigation detected within a volume of interest within the medical imaging data, comprising a step of:

delineating the object;

calculating a gradient kernel;

calculating a gradient field on boundaries of the delineated object using the gradient kernel;

calculating a magnitude of the gradient at each point on the boundaries; and calculating a principal gradient direction.

12. The method of claim 11, wherein the step of calculating the principal gradient direction includes calculating principal axes of the object, wherein a largest calculated principal axis is utilized to define a direction of which a distribution of gradient magnitude is calculated.

13. The method as set forth in claim 11, wherein the step of calculating includes identifying a principal direction of a largest principal axis of the objects is calculated based upon 3D moments and an inertia matrix, where the inertia matrix is based on second order central moments, and eigenvectors of the inertia matrix define the principal axes.

14. A system for detecting and identifying regions and/or volumes of interest ("regions") within medical image data, including a CAD sub-system, and a false positive reduction (FPR) subsystem, for mapping regions to one of two ground truth states with improved specificity thereby minimizing the number of false positives reported by the system, comprising:

a CAD sub-system for identifying and delineating regions of interest detected within image data;

a false positive reduction sub-system in communication with the CAD sub-system, which is first trained on a set of training data, and subsequently operate upon candidate regions within non-training data with improved specificity, comprising:

a feature extractor for extracting a pool of features corresponding to each CAD-delineated candidate region, including at least one of:

a 3D histogram-based feature subset or features from this subset, and a 3D gradient-based feature subset or features from this subset;

a genetic algorithm in communication with the feature extractor to determine an optimal sub-set of features from pool of features of the CAD-delineated regions used in training; and a support vector machine (SVM) in communication with the feature extractor and the genetic algorithm (GA), which maps each CAD-delineated candidate region detected in non-training data, post-training, based on the optimal subset of features;

wherein the system is trained on imaging data including candidate regions with known ground truth, by extracting a pool of features from each segmented region, using the genetic algorithm (GA) to identify an optimal subset of extracted features in order that the system displays sufficient discriminatory power during operation on non-training data in order to map the candidate regions with improved specificity.

15. The medical image classification system set forth in claim 14, where the CAD subsystem further includes a segmenting sub-system, which provides for reader input during the training to better delineate regions that are used for training.

16. The medical image classification system as set forth in claim 14, wherein the genetic algorithm (GA) operates upon a hierarchical fitness paradigm, in both training and operation on non-training data.

17. A method for classifying objects detected within medical imaging data that results a marked reduction in false positive classifications, comprising the steps of:

CAD processing to detect and delineate objects present in the medical imaging data;

post-CAD processing to generate a feature set with sufficient discriminatory power such that delineated objects may be classified with maximum specificity;

wherein during a training phase, a set of known training data is CAD-processed to segment objects within the training data, a pool of features extracted/calculated from/for the segmented objects that includes at least one of: a 3D histogram-based feature sub-set or features from this sub-set and a 3D gradient-based feature subset or features from this subset, and machine learning optimizes a sub-set of features from the pool of features, and wherein after training, candidate objects delineated by the CAD process are post-CAD processed, including feature extraction, and classification to classify the objects with high specificity in view of the post-CAD machine learning.

* * * * *